United States Patent [19]

Takigawa et al.

[11] 4,282,914
[45] Aug. 11, 1981

[54] PNEUMATIC TIRE FOR HEAVY LOAD VEHICLES

[75] Inventors: Hiroyoshi Takigawa, Kodaira; Nobuhiro Miyamura, Higashimurayama; Hiroshi Ogawa, Kodaira; Shinichiro Ohkuni, Tokyo, all of Japan

[73] Assignee: Bridgestone Tire Co., Ltd., Tokyo, Japan

[21] Appl. No.: 39,972

[22] Filed: May 17, 1979

[30] Foreign Application Priority Data

May 26, 1978 [JP] Japan .................................. 53-62944

[51] Int. Cl.³ ........................ B60C 11/00; B60C 11/08
[52] U.S. Cl. ............................ 152/209 D; 152/361 R
[58] Field of Search .... 152/209 D, 209 NT, 209 WT, 152/209 R, 330 R, 352 R, 361 R; D12/141, 142, 143, 152

[56] References Cited

U.S. PATENT DOCUMENTS

| | | | |
|---|---|---|---|
| 3,482,616 | 12/1969 | French | 152/209 R |
| 3,559,712 | 2/1971 | Verdier | 152/209 R |
| 3,818,964 | 6/1974 | Maiocchi | 152/209 R |
| 3,858,633 | 1/1975 | Boileau | 152/209 D |
| 3,897,813 | 8/1975 | Verdier | 152/209 R |

*Primary Examiner*—William A. Powell
*Assistant Examiner*—Thomas Bokan
*Attorney, Agent, or Firm*—Sughrue, Rothwell, Mion, Zinn and Macpeak

[57] ABSTRACT

A pneumatic tire for heavy load vehicles such as trucks and buses comprising a tread composed of a flat main region and an inclined region located at both side edges of the flat main region and including a number of notches spaced apart from each other and arranged substantially transversely to the circumferential direction of the tire.

4 Claims, 2 Drawing Figures

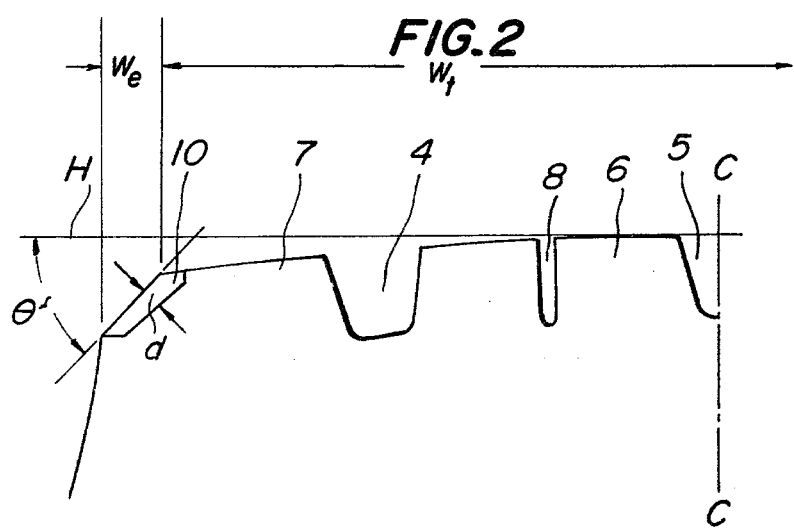

PNEUMATIC TIRE FOR HEAVY LOAD VEHICLES

BACKGROUND OF THE INVENTION

1. Field of the Invention

This invention relates to a pneumatic radial tire for heavy load vehicles, particularly trucks and buses which can effectively prevent wandering phenomenon.

2. Description of the Prior Art

The wandering phenomenon shall be understood to mean handle movement away from the usual route which has often been encountered by heavy load vehicles such as a large type truck or the like. This occurs when the vehicles run in a wheel print produced by dipping, particularly by the wearing of a paved road surface by the weight of vehicles which run frequently thereon and when the vehicles tend to getaway from the wheel print for the purpose of changing the route or of avoiding obstacles scattered on the road surface.

The wheel print produced on the paved road is primarily about 2 cm in depth and eventually inclusive of a deep wheel print which is deeper than 3 cm. The wandering phenomenon seldom occurs for passenger tires inflated by an internal pressure which is considerably lower than that used for the radial tire for heavy load vehicles and for bias-laid tire for heavy-load vehicles.

The wandering phenomenon exerts significant influences upon the radial tire for heavy load vehicles including a tread significantly reinforced by a belt having an extremely high rigidity and incorporated into a crown portion and inflated at a high internal pressure, that is, upon the radial tires for trucks and buses. The wandering phenomenon is rather inherent to these tires.

The radial tires for trucks and buses are of a so-called square shoulder in which the boundary between the tread and the side wall, that is, the shoulder is composed of a square ridge. In order to alleviate resistance to the tire produced when it rides on the wheel print, the square shoulder is made round to provide a so-called round shoulder, thereby preventing the wandering phenomenon.

But, the deflection of the round shoulder tire is under the influence of the amount of load, dynamic load due to oscillations of the tire when it runs, and as a result, the round shoulder partly functions as a ground contact region. Hence, the tire tends to be easily subjected to abnormal wear unless the internal pressure of the tire is successfully controlled. That is, this partial ground contact region is composed of a circle-shaped portion, so that the ground contact pressure is smaller than that of the flat tread. As a result, the partial ground contact region tends to easily respond to the local slide or movement thereof with respect to the road surface, thereby causing shoulder wear which is an abnormal premature wear induced at both side edges of the tread.

SUMMARY OF THE INVENTION

An object of the invention, therefore, is to provide a pneumatic radial tire for heavy load vehicles which can effectively prevent the wandering phenomenon and at the same time can prevent the shoulder wear.

A feature of the invention is the provision in a pneumatic radial tire for heavy load vehicles comprising a pair of annular bead bundles, a radial carcass toroidally extending between these bead bundles, and a reinforcing belt superimposed about the carcass and providing a tread composed of a crown portion including the reinforcing belt. The improvement perceives a tread composed of a relatively flat main region exclusively brought into contact with ground when the tire is normally running and a narrow inclined region located at both side edges of said main region and including a number of notches transversely extending said tread and circumferentially spaced apart from each other, said narrow inclined region being resiliently brought into contact with wheel prints formed on road surface to prevent wandering phenomenon.

The normally running of the tire shall be understood to mean change of routes on a good road divided into a plurality of routes and including no wheel prints and mean substantially rectilinear running without riding over the wheel prints on the bad road including the wheel prints.

Further objects and advantages of the invention will be fully understood from the following detailed description with reference to the accompanying drawings, in which:

BRIEF DESCRIPTION OF THE DRAWINGS

FIG. 2 is a view in section through a tire tread of FIG. 1.

DETAILED DESCRIPTION OF THE PREFERRED EMBODIMENTS

Figure 1:
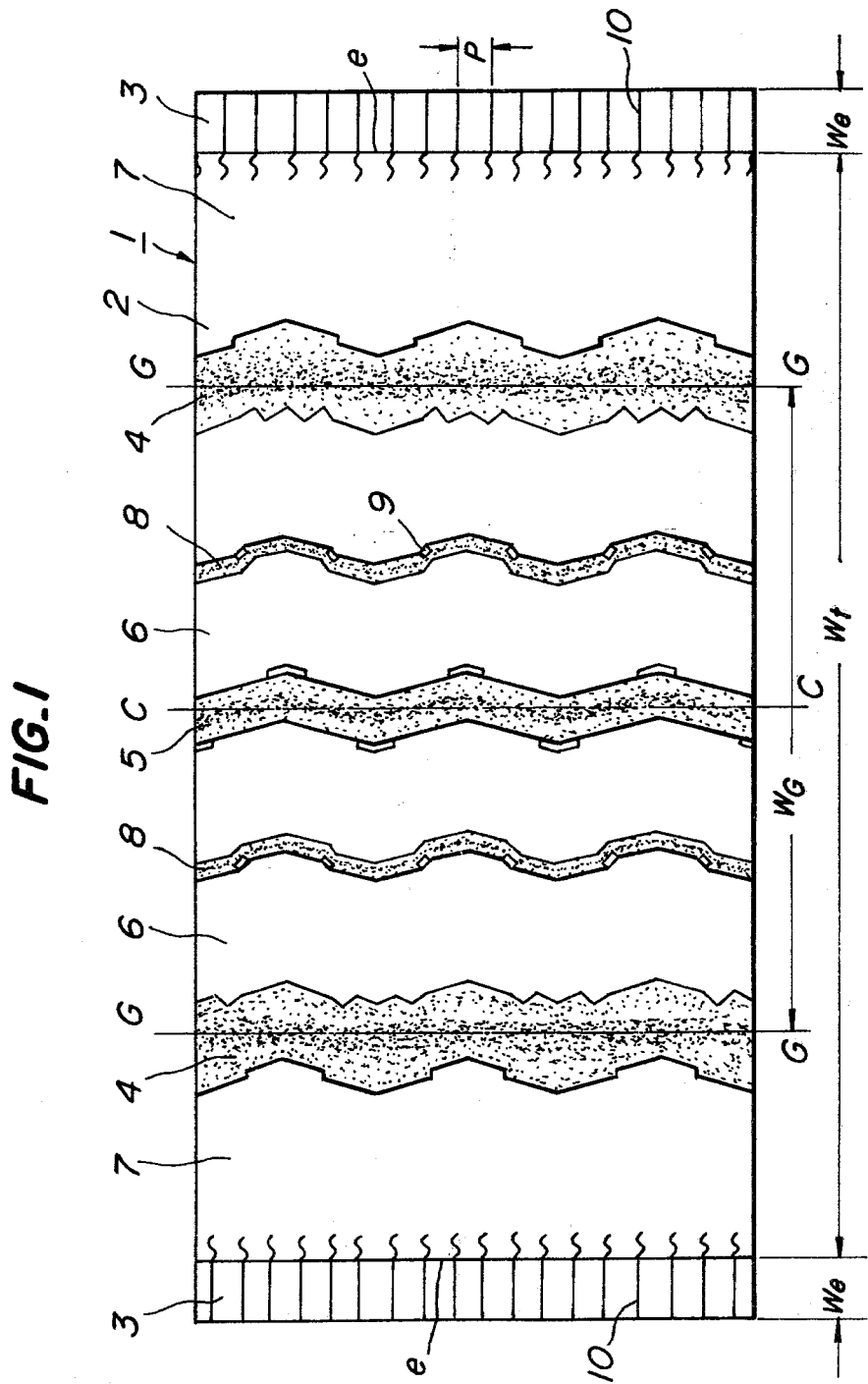
FIG. 1 is a plan view of a portion of a tread of a pneumatic radial tire for heavy load vehicles embodying the invention.

A pneumatic radial tire for heavy load vehicles shown in FIGS. 1 and 2 comprises a pair of annular bead bundles, a radial carcass extending toroidally across these bead bundles and an inextensible belt superimposed about the carcass and providing a tread composed of a crown portion including the reinforcing belt. These bead bundles, carcass and belt are omitted for convenience' sake of illustration. It is a matter of course that the tread partly shown in FIG. 1 extends circumferentially to form an endless tread.

Referring to FIG. 1, reference numeral 1 designates a tread composed of a main region 2 and inclined regions 3, 3 formed at both side edges of the main region 2.

In the present embodiment, the main region 2 of the tread 1 is provided with a pair of main grooves 4, 4 arranged symmetrically with respect to the equatorial plane C—C of the tire and an auxiliary groove 5 arranged on the equatorial plane C—C to define a first rib 6 between the main groove 4 and the auxiliary groove 5 on the one hand and define a second rib 7 between the main groove 4 and a side edge e of the main region 2 on the other hand.

It is preferable to make a mutual distance $W_G$ between center lines G—G of the main grooves 4, 4 a range of 50% to 70% of a width Wt of the main region 2 of the tread 1. It is desirous to make the main groove 4 and the auxiliary groove 5 so wide that these grooves are not closed at the ground contact surface under the normal running condition of the tire and to make the width of the auxiliary groove 5 equal to or more or less smaller than that of the main groove 4.

The first rib 6 has a width which is determined mainly by the distance between the main grooves 4, 4 and which is usually larger than that of the second rib 7. As a result, the first rib 6 is provided at its center portion with a narrow groove 8 so as to cause the first rib 6 to easily make contact with the road surface. In addition, the narrow groove 8 is provided at one of its side walls with a number of equally spaced apart spacers 9 each projected from one of the side walls toward the opposed side wall. These spacers 9 function to make two halves of the first rib 6 divided by the narrow groove 8 into one integral body therethrough and to maintain a space in the narrow groove 8 which is sufficient to introduce and remove drainage when it rains.

Referring to FIG. 2, each of the inclined regions 3, 3 provided at both side edges of the main region 2 of the tread 1 is composed of a frustoconical surface inclined at an angle $\theta$ within a range from 30° to 60° to a tangent H drawn from the tread 1 and extending in parallel with the rotational axis of the tire and provided with notches 10 spaced apart from each other by a given distance in the circumferential direction of the tread 1.

The value of the angle $\theta$ is determined to the above mentioned range from 30° to 60° owing to the following reasons. If the angle $\theta$ is smaller than the lower limit of 30°, there is a risk of the inclined region being made contact with ground depending upon the condition in use of the tire when the tire is normally running thereby inducing shoulder wear at that portion of the tire which extends from the inclined region 3 to a part of the main region 2. On the contrary, if the angle $\theta$ exceeds the upper limit of 60°, it becomes difficult to cause the inclined region 3 to engage ridges projected from both sides of the wheel print, thereby decreasing the effect of preventing the wandering phenomenon.

The inclined region 3 has a width Wt which can efficiently prevent the wandering phenomenon and maintain a width Wt of the main region 2 of the tread 1 necessary for the normal ground contact region of the tread 1. It is preferable, therefore, that the width We lies within a range from 2% to 7% of the width Wt of the main region 2 of the tread 1.

It is convenient to shape the notches 10 in the inclined region 3 in a mold when the tire is vulcanized. As a result, provision of notches 10 each having a width which is within a range from 0.3 mm to 1 mm is convenient for mold working without imparing the object of the invention.

The depth d, circumferential mutual space P and direction of the notch 10 are particularly important since they exert a considerable influence upon the rigidity of the inclined region 3. Experimental tests have demonstrated the result that it is effective to provide notches 10 having an average depth d of the order of 3 mm to 10 mm, average circumferential mutual distance P of 1% to 5% of the width Wt of the main region 2 of the tread 1 and arranged in a transverse direction of the tire. If the notches 10 as a whole are inclined at an angle which is smaller than 45° to the circumferential direction of the tread, the desired effect could not be obtained and abnormal wear tends to be induced at the side edge e of the main region 2. But, each of the notches 10 may be deformed such that that portion of the notch 10 which is located on the second rib 7 becomes S-shaped.

A test piece of the pneumatic radial tire for heavy load vehicles constructed as above described according to the invention and having a size of 10.00R20 14PR was manufactured and the wandering property and presence or absence of the shoulder wear thereof were ascertained by experimental tests. The test piece was composed of a tire comprising a carcass composed of 1 ply steel cord arranged in a radial direction and a belt composed of 4 plies of steel cords superimposed one upon the other, the tread including grooves arranged as shown in FIG. 1.

Various elements of the inclined region are shown in the following Table.

| | | |
|---|---|---|
| Inclined region 3 | Width (We/Wt × 100) | 5.3 |
| | Angle $\theta$ (°) | 45 |
| Notch 10 | Width (mm) | 0.5 |
| | Mutual Distance (P/Wt × 100) | 2.6 |
| | Depth (mm) | 5 |
| | Direction | 90° to the circumferential direction (Portion located on the second rib only is S-shaped |

The tire was mounted on a rim of 750 V and inflated by an internal pressure of 7.25 kg/cm$^2$. The assembly was mounted on a truck and a load subjected to the truck was so adjusted that the wheel becomes 2,425 kg in weight. Then, the tire was subjected to a running test for 50,000 km.

The wandering performance was investigated during the above mentioned running test. The handle movement when the tire runs in the wheel print and when the tire rides over the ridge of the wheel print to getaway therefrom and then comes thereinto, the frequency of correcting the handle movement or the like of the tire according to the invention were significantly improved if compared with those of the conventional tire which is not provided with the inclined region including the notches.

The tire according to the invention exhibited no shoulder wear during 50,000 km running.

What is claimed is:

1. In a pneumatic radial tire for heavy load vehicles comprising a pair of annular bead bundles, a radial carcass toroidally extending between these bead bundles, and a reinforcing belt superimposed about the carcass and providing a tread composed of a crown portion including the reinforcing belt, the improvement comprising; said tread composed of a relatively flat main region exclusively brought into contact with ground when the tire is normally running and a narrow inclined region located at both side edges of said main region, said narrow inclined region including a number of notches transversely extending said tread and circumferentially spaced apart from each other, said notches arranged circumferentially and spaced from each other by an average distance of 1% to 5% of the width of said main region, said narrow inclined region inclined at an angle within a range from 30° to 60° to a tangent drawn from said tread and extending in parallel with the rotational axis of the tire and being resiliently brought into contact with wheel prints formed on road surface to prevent wandering phenomenon.

2. The tire according to claim 1, wherein said notches have an average depth of the order of 3 mm to 10 mm.

3. The tire according to claim 1, wherein said inclined region is composed of a frustoconical surface.

4. The tire according to claim 1, wherein said inclined region has a width which is within a range from 2% to 7% of the width of said main region.

* * * * *